United States Patent
Takahashi et al.

(10) Patent No.: US 10,676,611 B2
(45) Date of Patent: Jun. 9, 2020

(54) PREPREG AND FIBER-REINFORCED COMPOSITE MATERIAL

(71) Applicant: TORAY INDUSTRIES, INC., Tokyo (JP)

(72) Inventors: Eiki Takahashi, Iyo-gun (JP); Daisuke Konishi, Iyo-gun (JP); Noriyuki Hirano, Iyo-gun (JP); Tatsuya Fujita, Kamakura (JP); Shuji Udagawa, Kamakura (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/313,652

(22) PCT Filed: Jul. 20, 2017

(86) PCT No.: PCT/JP2017/026304
§ 371 (c)(1),
(2) Date: Dec. 27, 2018

(87) PCT Pub. No.: WO2018/021146
PCT Pub. Date: Feb. 1, 2018

(65) Prior Publication Data
US 2019/0249002 A1 Aug. 15, 2019

(30) Foreign Application Priority Data

Jul. 25, 2016 (JP) .................................. 2016-145176
Jul. 25, 2016 (JP) .................................. 2016-145178

(51) Int. Cl.
| | | |
|---|---|---|
| C08L 63/00 | (2006.01) |
| C08J 5/24 | (2006.01) |
| B29C 70/02 | (2006.01) |
| C08G 59/50 | (2006.01) |
| C08G 59/24 | (2006.01) |
| C08G 59/32 | (2006.01) |
| C08G 59/38 | (2006.01) |

(52) U.S. Cl.
CPC ............. *C08L 63/00* (2013.01); *B29C 70/02* (2013.01); *C08G 59/245* (2013.01); *C08G 59/3245* (2013.01); *C08G 59/38* (2013.01); *C08G 59/50* (2013.01); *C08G 59/504* (2013.01); *C08J 5/24* (2013.01); *C08J 2363/00* (2013.01); *C08J 2463/04* (2013.01)

(58) Field of Classification Search
CPC ....... C08L 63/00; B29C 70/02; C08G 59/245; C08G 59/3245; C08G 59/38; C08G 59/50; C08G 59/504; C08J 5/24; C08J 2363/00; C08J 2463/04

USPC ........................................................ 523/453
See application file for complete search history.

(56) References Cited

U.S. PATENT DOCUMENTS

| | | |
|---|---|---|
| 2008/0145634 A1 | 6/2008 | Hillermeier et al. |
| 2010/0098906 A1 | 4/2010 | Bongiovanni et al. |
| 2010/0222461 A1 | 9/2010 | Bongiovanni et al. |
| 2013/0113142 A1 | 5/2013 | Dull |
| 2014/0186536 A1 | 7/2014 | Padilla-Acevedo et al. |

FOREIGN PATENT DOCUMENTS

| | | |
|---|---|---|
| JP | 2002-003581 A | 1/2002 |
| JP | 2007-224065 A | 9/2007 |
| JP | 4762239 B2 | 8/2011 |
| JP | 2012-506454 A | 3/2012 |
| JP | 2012-153746 A | 8/2012 |
| JP | 2013-095141 A | 5/2013 |
| JP | 2014-521824 A | 8/2014 |

OTHER PUBLICATIONS

Pilipenko et al., "Investigation of the Structural Effect of Sulfonate Aromatic Amines on the Hardening Process in Epoxy Compounds and on Polymer Properties", Zhurnal Prikladnoi Khimii, 1981, vol. 54, Issue 6, p. 1394-1398 (Year: 1981).*

Pilipenko et al., Translation of "Investigation of the Structural Effect of Sulfonate Aromatic Amines on the Hardening Process in Epoxy Compounds and on Polymer Properties", Zhurnal Prikladnoi Khimii, 1981, vol. 54, Issue 6, p. 1394-1398 (Year: 1981).*

Pilipenko et al., "Influence of Structure of Sulfo-Containing Aromatic Amines on the Curing of Epoxy Compounds and on the Properties of the Polymers," Journal of Applied Chemistry of the USSR, 54(6) 1173-1176 (1981).

* cited by examiner

*Primary Examiner* — David T Karst
(74) *Attorney, Agent, or Firm* — Squire Patton Boggs (US) LLP

(57) ABSTRACT

The purpose of the present invention is to provide a prepreg which satisfies one of a)-c): a) having superior storage stability and capable of providing a fiber-reinforced composite material having superior mechanical properties; b) capable of providing a fiber-reinforced composite material having superior mechanical properties, and the obtained fiber-reinforced composite material has superior appearance quality; and c) having superior storage stability, generating less amount of heat when cured, and enabling the cure extent and the viscosity in the B-stage state to be flexibly controlled. To achieve the purpose, the present invention provides a prepreg including reinforced fibers and an epoxy resin composition which contains an epoxy resin and a curing agent represented by a specific chemical formula, and which satisfies a specific condition.

4 Claims, No Drawings

PREPREG AND FIBER-REINFORCED COMPOSITE MATERIAL

TECHNICAL FIELD

The present invention relates to a prepreg including an epoxy resin composition and a reinforcing fiber as well as a fiber-reinforced composite material.

BACKGROUND ART

Epoxy resins are preferably used as a matrix resin of a fiber-reinforced composite material obtained by combining an epoxy resin and a reinforcing fiber such as a carbon fiber, a glass fiber, and an aramid fiber, utilizing high mechanical properties, heat resistance, and adhesiveness.

For the manufacture of fiber-reinforced composite materials, a sheet-like intermediate material (a prepreg) in which a reinforcing fiber is impregnated with an epoxy resin is widely used. A molded product is obtained by laminating prepregs and then heating them to cure the epoxy resin. Since various properties can be exhibited according to the laminate design of prepregs, prepregs have been applied to various fields such as aircraft and sports. In recent years, prepregs have also been applied in industrial uses such as uses in automobiles.

A molded product including a prepreg is required to exhibit excellent mechanical properties, and the requirement for the mechanical characteristics, in particular, the elastic modulus of the epoxy resin composition is high. Existing prepregs normally need to be frozen for storage. Thus, a prepreg that is more easily stored and handled is required, and the requirement for storage stability of epoxy resins is also high. In existing prepregs, in particular, in the prepregs of grades that are required to have high heat resistance, 4,4'-diaminodiphenyl sulfone is widely used as a curing agent. A good appearance is required in outer panel uses and the like, and techniques for improving an appearance such as a technique for void reduction have been drawing attention.

Further, though prepregs have been applied to relatively simple shapes in aerospace uses and sports uses, along with the expansion of the application range of composite materials to industrial uses in recent years, efforts to apply prepregs to more complex shapes have been made. However, since the tackiness and drapability required for prepregs are different according to the intended shape, a technique that achieves free control of these properties by adjusting the viscosity and degree of curing of the resin is required. The application to large structural materials such as vehicles and ships has also progressed, and the heat generated in the application needs to be reduced. Accordingly, a B stage technique is drawing attention, in which the viscosity and degree of curing can be controlled by reacting an epoxy resin composition halfway, and instant heat generation can be suppressed due to the multistage curing reaction.

Patent Document 1 discloses an epoxy resin composition that contains 3,3'-diaminodiphenyl sulfone as a curing agent and provides a cured product that exhibits excellent heat resistance and bending modulus. In addition, an epoxy resin composition capable of reducing the amount of heat generation during reaction by the addition of polysulfone as a thermoplastic resin is disclosed.

Patent Document 2 discloses a technique of improving storage stability by adding a sulfonium salt as a catalyst to an epoxy resin composition containing an aromatic amine as a curing agent.

Patent Document 3 discloses a technique of improving storage stability of an epoxy resin composition by using 4,4'-dimethyl-3,3'-diaminodiphenyl sulfone as a curing agent.

Patent Document 4 discloses a technique of introducing holes capable of removing a gas component to laminated prepregs to greatly reduce voids.

Patent Document 5 discloses a technique of introducing an edge breather to remove the trapped gas from the side of the laminated prepreg layer.

Patent Document 6 discloses a technique of continuously controlling the degree of curing by heating during the pultrusion process using curing agents having different reactivity in combination.

Patent Document 7 discloses an epoxy resin composition capable of achieving the B stage state by heating using curing agents or epoxy resins having different exothermic onset temperatures in combination.

Patent Document 8 discloses a technique of increasing the degree of curing of a prepreg by heat-treating a prepreg including an epoxy resin composition containing 3,3'-diaminodiphenyl sulfone and a hydrazine derivative as curing agents in combination.

Non-Patent Document 1 discloses, for an epoxy resin composition containing diaminodiphenyl sulfone as a curing agent, a difference in reactivity with an epoxy resin and a difference in the properties of the epoxy resin cured product obtained by curing the epoxy resin composition depending on a difference in the substitution position of diaminodiphenyl sulfone.

PRIOR ART DOCUMENTS

Patent Documents

Patent Document 1: Japanese Patent Laid-open Publication No. 2007-224065
Patent Document 2: Japanese Patent Laid-open Publication No. 2002-3581
Patent Document 3: Japanese Patent Laid-open Publication No. 2012-153746
Patent Document 4: Japanese Translation of PCT International Application Publication No. 2012-506454
Patent Document 5: Japanese Patent Laid-open Publication No. 2013-95141
Patent Document 6: Japanese Patent No. 4762239
Patent Document 7: Japanese Translation of PCT International Application Publication No. 2014-521824
Patent Document 8: US 2010/0222461
Non-Patent Document 1: Journal of applied chemistry of the USSR, 54(6) 1173(1981)

SUMMARY OF THE INVENTION

Problems to be Solved By the Invention

However, though the epoxy resin composition disclosed in Patent Document 1 provides excellent bending modulus, it is insufficient in the storage stability. Further, in a molded product obtained by press molding or the like, the appearance may be impaired by bubbles or the like. Furthermore, although it has been shown that heat generation can be reduced by adding a large amount of polysulfone to an epoxy resin to reduce the entire reactive groups, the solubility of polysulfone in the epoxy resin is limited, and the viscosity of a prepreg cannot be extensively controlled.

In Patent Document 2, an epoxy resin composition having high storage stability is disclosed. However, the mechanical properties, in particular, the bending modulus of the resin cured product is insufficient.

Although the epoxy resin composition disclosed in Patent Document 3 provides a resin cured product having a high bending modulus, the epoxy resin composition is insufficient in the storage stability.

In the technique disclosed in Patent Document 4, although the gas component can be removed by holes introduced into the prepreg, the mechanical properties are impaired due to stress concentration on the portion having holes.

In the technique disclosed in Patent Document 5, removing bubbles in the central portion of the prepreg takes time, and sufficient appearance quality may not be obtained.

In the continuous pultrusion technique described in Patent Document 6, an epoxy resin composition having a degree of curing that can be changed during the process is disclosed. However, a polyamine having high reactivity is used as a curing agent, and thus storage stability of the epoxy resin composition is insufficient.

In the epoxy resin composition described in Patent Document 7, the B stage state is achieved by utilizing a difference in reactivity between an aliphatic polyamine and an aromatic amine that are used in combination. However, the aliphatic polyamine has high reactivity with epoxy resins, and thus sufficient storage stability cannot be obtained.

In the prepreg including the epoxy resin composition described in Patent Document 8, although it has been shown that the tackiness is maintained in the B stage state, the viscosity and degree of curing of the prepreg cannot be arbitrarily controlled.

Non-Patent Document 1 discloses an epoxy resin composition containing 2,2'-diaminodiphenyl sulfone as a curing agent, but does not provide a resin formulation that exhibits an excellent bending modulus. Further, no technique for using the composition together with reinforcing fibers is disclosed.

The present invention aims to overcome such disadvantages of the prior art and to provide a prepreg that satisfies one of a) to c) below:

a) being capable of providing a fiber-reinforced composite material with excellent mechanical properties and having excellent storage stability;

b) being capable of providing a fiber-reinforced composite material with excellent mechanical properties and providing excellent appearance quality of the obtained fiber-reinforced composite material; and c) enabling arbitrary control of the viscosity and degree of curing in the B stage state, having excellent storage stability, and, in addition, generating smaller amount of heat during curing.

Solutions to the Problems

As a result of intensive studies to solve the above problems, the present inventors have found an epoxy resin composition having the following constitution, thereby completing the present invention. That is, the present invention has the following constitution.

(1) A prepreg including an epoxy resin composition that contains a curing agent A represented by Chemical formula A and an epoxy resin, and satisfies one of (i) to (iii) below; and a reinforcing fiber:

[Chemical formula 1]

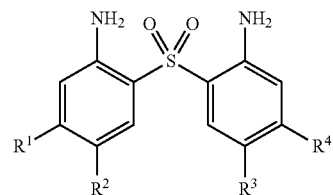

Chemical formula A wherein $R^1$, $R^2$, $R^3$ and $R^4$ each independently represent hydrogen, methyl, ethyl, or n-propyl:
  (i) satisfying Conditions 1 and 2;
  (ii) satisfying Conditions 1 and 3; and
  (iii) satisfying Condition 4
where Conditions 1 to 4 are as follows:
  Condition 1: a bending modulus of a resin cured product obtained by curing the epoxy resin composition at 220° C. for 120 minutes is 3.60 GPa or more;
  Condition 2: Tg change of the epoxy resin composition between before and after storage at 40° C. and 75% RH for 10 days is less than 10° C.;
  Condition 3: a temperature at which the epoxy resin composition exhibits a minimum viscosity when heated at a rate of 5° C./min from 40° C. to 250° C. in dynamic viscoelastic measurement is 150° C. or more and 200° C. or less; and
  Condition 4: the epoxy resin composition contains a combination of the curing agent A and a curing agent B or a combination of the curing agent A and a curing agent C as a curing agent:
  Curing agent B: 4,4'-dimethyl-3,3'-diaminodiphenyl sulfone; and
  Curing agent C: 3,3'-diaminodiphenyl sulfone.

(2) The prepreg according to (1) above, wherein $R^1$, $R^2$, $R^3$, and $R^4$ in Chemical formula A are all hydrogen.

(3) The prepreg according to (1) or (2) above, having a total content of a component X below of 20 to 50% by mass relative to 100% by mass of a total mass of the epoxy resin:

Component X: at least one epoxy resin selected from the group consisting of [x1], [x2], and [x3] below:
  [x1]: a trifunctional or higher functional epoxy resin having a benzene ring;
  [x2]: a bisphenol F epoxy resin; and
  [x3]: an isocyanuric acid epoxy resin.

(4) A fiber-reinforced composite material, which is a cured product of the prepreg according to any one of (1) to (3) above.

Effects of the Invention

A first aspect of the prepreg of the present invention is capable of providing a fiber-reinforced composite material with excellent mechanical properties and has excellent storage stability A second aspect of the prepreg of the present invention is capable of providing a fiber-reinforced composite material with excellent mechanical properties, and provides excellent appearance quality of the obtained fiber-reinforced composite material.

A third aspect of the prepreg of the present invention enables arbitrary control of the viscosity and degree of curing in the B stage state, has excellent storage stability, and, in addition, generates smaller amount of heat during curing.

Embodiments of the Invention

The prepreg of the present invention includes an epoxy resin composition that contains a curing agent A represented by Chemical formula A and an epoxy resin, and satisfies one of (i) to (iii) above; and a reinforcing fiber. The epoxy resin composition may satisfy a combination of any two of (i) to (iii) above, or may satisfy all of (i) to (iii) above.

The epoxy resin composition of the present invention contains a curing agent A and an epoxy resin.

The curing agent A in the present invention is a 2,2'-diaminodiphenyl sulfone analogue represented by Chemical formula A.

[Chemical formula 2]

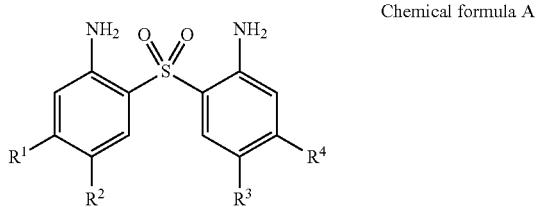

Chemical formula A $R^1$, $R^2$, $R^3$ and $R^4$ in Chemical formula A each independently represent hydrogen, methyl, ethyl, or n-propyl.

In the prepreg of the present invention, $R^1$, $R^2$, $R^3$ and $R^4$ are preferably all hydrogen. That is, the curing agent A represented by Chemical formula A is preferably 2,2'-diaminodiphenyl sulfone from the viewpoint of storage stability. The 2,2'-diaminodiphenyl sulfone analogue may be used alone or in combination with other curing agents to the extent that the effect of the present invention is not lost.

For the content of the curing agent A in the epoxy resin composition of the present invention, the amount of the active hydrogen in the curing agent A is preferably 0.5 to 2.0 times, more preferably 0.8 to 1.2 times the amount of epoxy groups in the epoxy resin. The units of the amount of epoxy groups and the amount of the active hydrogen are both moles. When the amount of the active hydrogen in the curing agent A is less than 0.5 times, the crosslink density of the cured product is insufficient, thus the elastic modulus and the heat resistance are insufficient, and the static strength properties of the fiber-reinforced composite material may be insufficient. When the amount of the active hydrogen in the curing agent A is more than 2.0 times, the cured product has reduced plastic deformation capacity and the fiber composite material may be poor in the impact resistance.

The epoxy resin composition of the present invention satisfies one of (i) to (iii) below:
  (i) satisfying Conditions 1 and 2,
  (ii) satisfying Conditions 1 and 3, and
  (iii) satisfying Condition 4.

Each of the conditions will be described below.

Condition 1 in the present invention is as follows: a bending modulus of a resin cured product obtained by curing the epoxy resin composition at 220° C. for 120 minutes is 3.60 GPa or more.

The epoxy resin composition that satisfies (i) or (ii) in the present invention satisfies Condition 1. That is, when the bending modulus of the resin cured product is 3.60 GPa or more, a fiber-reinforced composite material that satisfies the recent high physical property requirements and has excellent mechanical properties is obtained. Though the upper limit of the bending modulus is not particularly limited, the bending modulus is more preferably 3.60 GPa to 5.00 GPa. When the bending modulus is 5.00 GPa or less, good toughness is easily obtained.

The bending modulus of the epoxy resin cured product in the present invention can be measured by the three point bending test of a plate of a resin cured product. The plate of a resin cured product can be obtained, for example, by placing a resin in a mold set to give a predetermined thickness with a spacer, and heating and curing the resin. The obtained plate of a resin cured product is cut into a predetermined size to give a specimen.

Condition 2 in the present invention is as follows: Tg change of the epoxy resin composition between before and after storage at 40° C. and 75% RH for 10 days is less than 10° C.

The epoxy resin composition that satisfies (i) in the present invention satisfies Condition 2. That is, when the Tg change between before and after storage at 40° C. and 75% RH for 10 days is less than 10° C., the prepreg including the epoxy resin composition and a reinforcing fiber exhibits excellent storage stability even at room temperature. On the other hand, when the Tg change is 10° C. or more, the tackiness change of the prepreg in storage at room temperature is large and the prepreg needs to be stored under a precise temperature and humidity environment. The lower limit of the Tg change between before and after storage at 40° C. and 75% RH for 10 days is not particularly limited as long as it is less than 10° C. The Tg change is preferably 0° C. or more and less than 10° C.

The storage stability of the epoxy resin composition, that is, whether Condition 2 is satisfied or not, can be evaluated, for example, by tracking the Tg change by differential scanning calorimetry (DSC). Specifically, the storage stability can be determined by storing the epoxy resin composition in a thermo-hygrostat bath or the like for a predetermined period and measuring the Tg change between before and after storage by DSC.

Condition 3 in the present invention is as follows: a temperature at which the epoxy resin composition exhibits a minimum viscosity when heated at a rate of 5° C./rain from 40° C. to 250° C. in dynamic viscoelastic measurement is 150° C. or more and 200° C. or less.

Condition 3 in the present invention is as follows: a temperature at which the epoxy resin composition exhibits a minimum viscosity when heated at a rate of 5° C./min from 40° C. to 250° C. in dynamic viscoelastic measurement (DMA) is 150° C. or more and 200° C. or less. The prepreg including the epoxy resin composition exhibits sufficient fluidity during heat molding, and trapped air and volatile components are removed from the prepreg. Thus, voids are suppressed and a fiber-reinforced composite material excellent in appearance quality is obtained. When the temperature at which the epoxy resin composition exhibits a minimum viscosity is less than 150° C., the resin viscosity tends to rise during molding, air and volatile components are taken in, and the appearance quality of the fiber-reinforced composite material may be impaired. When the temperature at which the epoxy resin composition exhibits a minimum viscosity is more than 200° C., the start of resin curing is delayed, thus, the resin may flow out during molding, and blurs may appear on the surface of the fiber-reinforced composite material.

The temperature at which the epoxy resin composition exhibits a minimum viscosity, that is, whether Condition 3 is satisfied or not, can be evaluated, for example, by tracking the change in viscosity by dynamic viscoelastic measurement. Specifically, it can be evaluated by observing the temperature at which the epoxy resin composition exhibits a minimum viscosity when the composition is heated at a rate of 5° C./min from 40° C. to 250° C. using a rheometer (a rotary dynamic viscoelasticity measuring instrument).

Condition 4 in the present invention is as follows: the epoxy resin composition contains a combination of the curing agent A and a curing agent B or a combination of the curing agent A and a curing agent C as a curing agent.

Curing agent B: 4,4'-dimethyl-3,3'-diaminodiphenyl sulfone

Curing agent C: 3,3'-diaminodiphenyl sulfone

The epoxy resin composition that satisfies (iii) in the present invention satisfies Condition 4. That is, when the epoxy resin composition contains, as a curing agent for the epoxy resin, either of a combination of the curing agent A and the curing agent B (4,4'-dimethyl-3,3'-diaminodiphenyl sulfone), and a combination of the curing agent A and the curing agent C (3,3'-diaminodiphenyl sulfone), the precured product obtained by the method described below has excellent storage stability. To the extent that the effect of the present invention is not lost, the epoxy resin composition that satisfies Condition 4 in the present invention may contain, in addition to the combination of curing agents, the curing agent B, the curing agent C, or other curing agents.

The curing agent A is added to increase the exothermic onset temperature of the epoxy resin composition and to increase the storage stability and the bending modulus of the resin cured product.

The curing agent B and the curing agent C are used to lower the exothermic onset temperature of the epoxy resin composition and to increase the degree of curing of the epoxy resin composition after precuring, that is, the precured product.

In the epoxy resin composition that satisfies Condition 4 in the present invention, by using the curing agents as a combination of the curing agent A and the curing agent B or a combination of the curing agent A and the curing agent C, one of the curing agents is selectively consumed when the composition is precured at 140° C. for 2 hours to give a precured product. Therefore, a precured product having degree of curing and resin viscosity adjusted in accordance with the contained amount of curing agents can be obtained. Since the curing agent remaining in the precured product after precuring is excellent in storage stability, the precured product can be stored for a long period of time. An index of the storage stability of the epoxy resin composition is, for example, the increase in the glass transition temperature (Tg) during storage. The smaller the value is, the more suitable the prepreg including the epoxy resin composition for long-term storage.

The epoxy resin composition that satisfies Condition 4 in the present invention can be precured by heating. The precured product can be obtained by pouring an epoxy resin composition into an aluminum cup or a mold and heating it at a predetermined temperature.

When the precured product obtained by precuring the epoxy resin composition that satisfies Condition 4 in the present invention at 140° C. for 2 hours is stored at 40° C. and 75% RH for 6 days, the Tg change of the precured product is preferably less than 10° C. When the Tg change of the precured product is 10° C. or more, the storage stability of the precured product after precuring may be insufficient. The lower limit of the Tg change of the precured product is not particularly limited as long as it is less than 10° C. The Tg change is preferably 0° C. or more and less than 10° C.

The precured product of the epoxy resin composition that satisfies Condition 4 in the present invention can be additionally cured so that the unreacted curing agent is reacted to give a resin cured product. The conditions for additional curing are appropriately selected. When the precured product is additionally cured, for example, at 220° C. for 2 hours, a resin cured product having excellent mechanical properties can be easily obtained.

When the precured product obtained by precuring the epoxy resin composition that satisfies Condition 4 in the present invention at 140° C. for 2 hours is additionally cured at 220° C. for 2 hours to give a resin cured product, the bending modulus of the resin cured product is preferably 3.60 GPa or more from the viewpoint of obtaining a fiber-reinforced composite material having excellent mechanical properties. Though the upper limit of the bending modulus is not particularly limited, the bending modulus is particularly preferably 3.60 GPa to 5.00 GPa. When the bending modulus is more than 5.00 GPa, the toughness may decrease.

When the precured product obtained by precuring the epoxy resin composition that satisfies Condition 4 in the present invention at 140° C. for 2 hours is heated (additionally cured) under conditions of a constant rate of 5° C./min from 30° C. to 300° C. using a differential scanning calorimeter, the amount of heat generation is preferably in the range of 100 to 250 J/g. The laminate of the prepregs including the epoxy resin composition that satisfies Condition 4 in the present invention can be cured at 140° C. for 2 hours to give a precured product, and then the precured product can be additionally cured at a higher temperature to give a molded product. When the amount of heat generation during additional curing of the precured product of the epoxy resin composition that satisfies Condition 4 in the present invention is in the above range, the amount of heat generation during curing can be suppressed within an appropriate range, and thus, a fiber-reinforced composite material having excellent mechanical properties can be easily obtained.

The amount of heat generation of the precured product can be calculated from the total area of peaks obtained from the heat generation chart obtained from the DSC measurement.

The epoxy resin composition that satisfies Condition 4 in the present invention preferably satisfies Condition 5 below.

Condition 5: T1 and T2 satisfy the following expression, where T1 (° C.) and T2 (° C.) are the exothermic onset temperature of an epoxy resin composition containing only a first curing agent as a curing agent and the exothermic onset temperature of an epoxy resin composition containing only a second curing agent as a curing agent, respectively, when the compositions are heated under conditions of a constant rate of 5° C./min from 30° C. to 300° C. using a differential scanning calorimeter.

$$30 < |T2 - T1| < 90 \quad \text{[Expression 1]}$$

(Two kinds of curing agents selected from the curing agent A, the curing agent B, and the curing agent C are referred to as a first curing agent and a second curing agent)

The epoxy resin composition containing only a first curing agent as a curing agent means a composition having the same composition as that of the epoxy resin composition shown in Condition 4 in the present invention as a target except that the used curing agent is only the first curing agent. The epoxy resin composition containing only a second curing agent as a curing agent means a composition having the same composition as that of the epoxy resin composition shown in Condition 4 in the present invention as a target except that the used curing agent is only the second curing agent.

When the epoxy resin composition that satisfies Condition 4 in the present invention satisfies Condition 5, a precured product having degree of curing and resin viscosity adjusted in accordance with the contained amount of curing agents can be obtained. This is because the first curing agent is selectively consumed and the second curing agent remains in the precured product (herein, for the first curing agent and the second curing agent, the curing agent selectively consumed relatively earlier is the first curing agent) when the composition is precured at 140° C. for 2 hours to give the precured product.

For Condition 5, the greater the value of |T2−T1| is, that is, the greater the difference between the exothermic onset temperatures of the first curing agent and the second curing agent is, the more widely the degree of curing of the precured product can be controlled. However, when the value of |T2−T1| is 90° C. or more, the storage stability of the epoxy resin composition may decrease. Meanwhile, when the value of |T2−T1| is 30° C. or less, the degree of curing of the precured product may not be controlled according to the compounding ratio among the curing agents. The epoxy resin composition that satisfies Condition 5 and the precured product of the epoxy resin composition tend to be excellent in storage stability.

To the extent that the effect of the present invention is not lost, the epoxy resin composition of the present invention may contain, in addition to the combinations of curing agents, other curing agents other than the curing agent A to the curing agent C.

T1 and T2 are measured by thermal analysis using a differential scanning calorimeter (DSC). The heat generation observed by the DSC measurement is the heat generated by the reaction of the epoxy resin composition. Accordingly, the heat generation chart in which the horizontal axis represents time and the vertical axis represents the heat flow rate in the constant rate heating measurement shows temperature dependency of the reaction. Therefore, the rise of the peak in the chart represents the exothermic onset temperature and can be used as an indicator of reactivity.

The prepreg of the present invention preferably has a total content of a component X below of 20 to 50% by mass relative to 100% by mass of a total mass of the epoxy resin.

Component X: at least one epoxy resin selected from the group consisting of [x1], [x2], and [x3] below:
[x1]: a trifunctional or higher functional epoxy resin having a benzene ring;
[x2]: a bisphenol F epoxy resin; and
[x3]: an isocyanuric acid epoxy resin.

When the component X is contained in an amount in the above range, the bending modulus of the resin cured product can be further increased without impairing the handling properties during prepreg formation and molding process. In addition, the heat generation during molding can be easily suppressed within an appropriate range.

[x1] of the component X is a trifunctional or higher functional epoxy resin having a benzene ring. Examples of the epoxy resin include glycidyl ether epoxy resins such as trisphenyl glycidyl ether methane, and glycidyl amine epoxy resins such as N,N,O-triglycidyl-m-aminophenol, N,N,O-triglycidyl-p-aminophenol, and N,N,N',N'-tetraglycidyl-4,4'-methylenedianiline. Among them, N,N,O-triglycidyl-m-aminophenol and N,N,N',N'-tetraglycidyl-4,4'-methylenedianiline are preferably used.

[x2] of the component X is a bisphenol F epoxy resin. The bisphenol F epoxy resin may be in a liquid form or a solid form. Examples of the bisphenol F epoxy resin include "EPICLON (registered trademark)" Epc830 (bisphenol F epoxy resin, manufactured by Dainippon Ink & Chemicals, Inc.), "Epotohto (registered trademark)" YDF-2001 (bisphenol F epoxy resin, manufactured by Tohto Kasei Co., Ltd.), and "jER (registered trademark)" 4010 P (bisphenol F epoxy resin, manufactured by Mitsubishi Chemical Corporation).

[x3] of the component X is an isocyanuric acid epoxy resin. Examples of the isocyanuric acid epoxy resin include "TEPIC (registered trademark)" G (manufactured by Nissan Chemical Industries, Ltd.), "TEPIC (registered trademark)" S (manufactured by Nissan Chemical Industries, Ltd.), and "Araldite (registered trademark)" PT9810 (manufactured by Huntsman Advanced Materials Co., Ltd.).

As described above, the epoxy resin composition of the present invention preferably contains 20 to 50% by mass of the component X in total relative to 100% by mass of the total amount of the epoxy resin. When a plurality of components (compounds) are contained as the component X, the expression that the epoxy resin composition contains 20 to 50% by mass of the component X in total means that the total amount of the component X is 20 to 50% by mass. That is, when the epoxy resin composition of the present invention contains [x2] and [x3] as the component X, the total amount of [x2] and [x3] is preferably 20 to 50% by mass.

The component X is preferably [x2] and/or [x3], particularly preferably [x3] from the viewpoint of increasing the bending modulus.

The epoxy resin composition of the present invention can contain, to the extent that the effect of the present invention is not impaired, bisphenol A epoxy resins, bisphenol S epoxy resins, biphenyl epoxy resins, naphthalene epoxy resins, epoxy resins having a fluorene skeleton, N,N-diglycidylaniline, and epoxy resins having an epoxy group such as monofunctional epoxy.

The epoxy resin composition of the present invention may contain, to the extent that the effect of the present invention is not lost, a thermoplastic resin to improve the tackiness and drapability of the prepreg by adjusting the viscoelasticity and to improve the mechanical properties and toughness of the resin composition. As the thermoplastic resin, a thermoplastic resin soluble in an epoxy resin, organic particles such as rubber particles and thermoplastic resin particles, and the like can be selected.

Examples of the thermoplastic resin soluble in an epoxy resin include polyvinyl acetal resins such as polyvinyl formal and polyvinyl butyral, polyvinyl alcohol, phenoxy resins, polyamide, polyimide, polyvinyl pyrrolidone, and polysulfone.

Examples of the rubber particles include crosslinked rubber particles and core-shell rubber particles in which heterogeneous polymers are graft-polymerized on the surfaces of the crosslinked rubber particles.

The epoxy resin composition of the present invention may contain, to the extent that the effect of the present invention is not lost, coupling materials, thermosetting resin particles, carbon black or carbon particles, conductive particles such as metal-plated organic particles, inorganic fillers such as silica gel and clay, and nanoparticles such as CNTs and graphene. The addition of these substances has effects of increasing the viscosity of the epoxy resin composition, adjusting the viscosity to reduce the resin flow, improving the elastic modulus and heat resistance of the resin cured product, and improving the abrasion resistance.

When the epoxy resin composition of the present invention contains the curing agent A, high levels of both the bending modulus of the resin cured product and the storage stability of the epoxy resin composition can be achieved. Since the curing agent A is a diaminodiphenyl sulfone analogue having an amino group at the ortho position, the agent can form an epoxy resin network having high flexibility when the resin is cured. It is presumed that, as the result, the bending modulus of the resin cured product is improved. The effect on excellent storage stability is uncertain. However, it is presumed that since the amino group of the curing agent A is adjacent to the ortho position of the sulfonyl group, the amino group and the epoxy group are not likely to come into contact with each other at room temperature due to steric hindrance of the sulfonyl group, and thus, an epoxy resin composition having excellent storage stability is obtained.

Further, when the epoxy resin composition of the present invention contains the curing agent A, an epoxy resin composition that can achieve high levels of both the bending modulus of the resin cured product and the appearance quality of the molded product can be provided. It is presumed that the epoxy resin composition of the present invention provides a fiber-reinforced composite material having an excellent appearance because the epoxy resin composition is improved in the fluidity of the resin during molding, and removes bubbles to the outside. It is presumed that the reason why the fluidity of the resin is improved is as follows: the amino group of the curing agent A is adjacent to the ortho position of the sulfonyl group, thus the amino group and the epoxy group are not likely to come into contact with each other due to steric hindrance of the sulfonyl group, and the formation of the crosslinked structure is delayed.

The epoxy resin composition of the present invention can be prepared by kneading components using a machine such as a kneader, a planetary mixer, a triple roll and a twin-screw extruder, or, if the components can be kneaded uniformly, by hand using a beaker and a spatula or the like.

To obtain a fiber-reinforced composite material containing the epoxy resin composition of the present invention, it is preferred to previously prepare a prepreg including the epoxy resin composition and a reinforcing fiber. The prepreg is a material form in which the arrangement of fibers and the ratio of resins can be precisely controlled and which is capable of maximizing the properties of composite materials. The prepreg can be obtained by impregnating a reinforcing fiber base material with the epoxy resin composition of the present invention. Examples of the method of impregnation include hot melt method (dry method). The hot melt method is a method of directly impregnating the reinforcing fiber with an epoxy resin composition having a viscosity reduced by heating or a method in which a film having a release paper or the like coated with an epoxy resin composition is prepared, then the film is placed over both sides or one side of a reinforcing fiber, and the resulting product is heated and pressed to impregnate the reinforcing fiber with the resin.

As a method of molding the laminated prepreg, for example, press molding method, autoclave molding method, bagging molding method, lapping tape method, internal pressure molding method or the like can be used as appropriate.

Next, the fiber-reinforced composite material will be described. The fiber-reinforced composite material of the present invention is a cured product of the prepreg of the present invention. That is, the fiber-reinforced composite material is obtained by curing the epoxy resin composition contained in the prepreg of the present invention. More specifically, the fiber-reinforced composite material containing the resin cured product of the epoxy resin composition of the present invention as a matrix resin can be obtained by laminating the prepregs including the epoxy resin composition of the present invention, and then heating and curing the laminate.

The reinforcing fiber used in the present invention is not particularly limited, and a glass fiber, a carbon fiber, an aramid fiber, a boron fiber, an alumina fiber, a silicon carbide fiber and the like can be used. Two or more of these fibers may be mixed and used. From the viewpoint of obtaining a light and highly rigid fiber-reinforced composite material, a carbon fiber is preferably used.

The fiber-reinforced composite material of the present invention is preferably used for sports uses, aerospace uses, and general industrial uses. More specifically, in sports uses, the fiber-reinforced composite material is preferably used for golf shafts, fishing rods, tennis and badminton rackets, sticks for hockey and the like, ski poles and the like. In aerospace uses, the fiber-reinforced composite material is preferably used for aircraft primary structural materials such as main wings, tails, and floor beams, and secondary structural materials such as interior materials. Furthermore, in general industrial uses, the fiber-reinforced composite material is preferably used for structural materials of automobiles, bicycles, ships, railway vehicles and the like. In particular, in the prepreg including the epoxy resin composition of the present invention and a carbon fiber, the tackiness and drapability can be widely controlled, and in addition, the prepreg is excellent in storage stability. Therefore, the fiber-reinforced composite material that is obtained by curing the epoxy resin composition in the prepreg is preferably used for members required to have complicated shapes such as members in automobile uses. More specifically, the fiber-reinforced composite material is also applicable to hybrid molding with a different material such as hybrid molding of a door panel or a seat back of an automobile, and is preferably used for members required to have flexibility in the construction method. In addition, the fiber-reinforced composite material is particularly preferably used for a large-sized structure that often requires large thickness of a molded product utilizing the characteristics that the amount of heat generation during curing is small and the fiber-reinforced composite material having high mechanical properties can be obtained.

EXAMPLES

The present invention will be described more specifically with reference to examples below, but the present invention is not limited to the description of these examples.

The components used in examples are as follows.
<Material Used>
Curing Agent A
[A]-1 2,2'-diaminodiphenyl sulfone
(Synthesis) At room temperature, 2,2'-diaminodiphenylsulfide (1.1 kg, 5.1 mol, manufactured by Chengzhou Harvestchem) was dissolved in N,N-dimethylformamide (DMF) (10.1 L), potassium peroxymonosulfate (4.7 kg, 7.6 mol) was added thereto, and the mixture was stirred at room temperature for 20 hours. Subsequently, water (22 L) and toluene (22 L) were added to the reaction liquid, and the mixture was stirred for 30 minutes and then filtered through Celite. The filtrate was washed with toluene (10 L). The filtrate was separated, and the aqueous layer was extracted with toluene (10 L). The obtained organic layer was washed with water (10 L), saturated aqueous sodium thiosulfate solution (10 L), and saturated saline (10 L) in this order, and concentrated under reduced pressure to give a crude product.

(Purification) The obtained crude product was dissolved in ethanol (2.5 L), then water (0.8 L) was added thereto, and the precipitated solid was collected by filtration. Subsequently, the solid obtained by filtration was dissolved in ethyl acetate, silica gel (150 g) was added thereto, the mixture was stirred for 30 minutes, and then filtered under reduced pressure on 150 g of silica gel, and the filtrate was concentrated to give a crude product. Further, methanol (0.8 L) was added to the obtained crude product, and the mixture was stirred for 30 minutes. Then, the solid was collected by filtration and dried at 40° C. under reduced pressure to give 2,2'-diaminodiphenyl sulfone (0.43 kg).

[x1]: a trifunctional or higher functional epoxy resin having a benzene ring

[x1]-1 "SUMI-EPDXY (registered trademark)" ELM 434 (a diaminodiphenylmethane epoxy resin, manufactured by Sumitomo Chemical Industry Company Limited)

[x1]-2 "Araldite (registered trademark)" MY0600 (an aminophenol epoxy resin, manufactured by Huntsman Advanced Materials Co., Ltd.)

[x1]-3 "jER (registered trademark)" 154 (a phenol novolak epoxy resin, manufactured by Japan Epoxy Resins Co., Ltd.)

[x2]: a bisphenol F epoxy resin

[x2]-1 "EPICLON (registered trademark)" Epc830 (a bisphenol F epoxy resin, manufactured by Dainippon Ink & Chemicals, Inc.)

[x2]-2 "Epotohto (registered trademark)" YDF-2001 (a bisphenol F epoxy resin, manufactured by Tohto Kasei Co., Ltd.)

[x2]-3 "jER (registered trademark)" 4010P (a bisphenol F epoxy resin, manufactured by Mitsubishi Chemical Corporation)

[x3]: an isocyanuric acid epoxy resin

[x3]-1 "TEPIC (registered trademark)" S (an isocyanuric acid epoxy resin, manufactured by Nissan Chemical Industries, Ltd.)

epoxy resins [x4] other than epoxy resins [x1], [x2], and [x3]

[x4]-1 "jER (registered trademark)" 828 (a bisphenol A epoxy resin, manufactured by Mitsubishi Chemical Corporation)

[x4]-2 "EPICLON (registered trademark)" EXA-1514 (a bisphenol S epoxy resin, manufactured by Dainippon Ink & Chemicals, Inc.)

[x4]-3 "Epikote (registered trademark)" YX4000H (a biphenyl epoxy resin, manufactured by Japan Epoxy Resins Co., Ltd.)

Curing Agents Other than the Curing Agent A

Curing agent B 4,4'-dimethyl-3,3'-diaminodiphenyl sulfone

Curing agent C 3,3'DAS (3,3'-diaminodiphenyl sulfone, manufactured by MITSUI FINE CHEMICALS, Inc.)

Seikacure-S (4,4'-diaminodiphenyl sulfone, manufactured by SEIKA CORPORATION)

The curing agent B was prepared by the method described below.

[Step 1] Manufacturing Step of 4,4'-dimethyl-3,3'-dinitrodiphenylsulfone

In concentrated sulfuric acid (2.3 L, 4.2 mol), 4,4'-dimethyldiphenylsulfone (1.4 kg, 5.7 mol, manufactured by Sigma-Aldrich Co. LLC) was dissolved, and then the solution was cooled to 4° C. Concentrated nitric acid (0.76 L, 17.1 mol) was added dropwise thereto over 4 hours while maintaining the temperature of the reaction solution at 11° C., and the mixture was stirred at room temperature overnight. Subsequently, the reaction solution was cooled to 6° C. and ice water (1.4 L) was added thereto over 2 hours while maintaining the temperature at 15° C. or less. The precipitated solid was collected by filtration and the filtrate was washed with water. The obtained solid was dried under reduced pressure at 50° C. to give 1.8 kg of a white solid. The obtained white solid was dissolved in chloroform (25 L) and the solution was stirred. Then, heptane (25 L) was added thereto, the mixture was stirred for 30 minutes, and then the precipitated solid was collected by filtration. The solid obtained by filtration was dried under reduced pressure to give 1.6 kg of 4,4'-dimethyl-3,3'-dinitrodiphenylsulfone.

[Step 2] Manufacturing Step of 4,4'-dimethyl-3,3'-diaminodiphenyl Sulfone

In methanol (5.0 L), 4,4'-dimethyl-3,3'-dinitrodiphenylsulfone (0.55 kg, 1.64 mol) was dissolved, and the air inside the system was replaced with argon gas. In another container, 5% palladium carbon (0.13 kg, 50% wet) was added to methanol (1.0 L) degassed with argon gas to prepare a suspension of palladium carbon. The suspension was added to 4,4'-dimethyl-3,3'-dinitrodiphenylsulfone in methanol, and methanol (0.6 L) was further added thereto. Subsequently, the air inside the reaction system was replaced with hydrogen gas, and the mixture was stirred for 2 days while replenishing hydrogen. Thereafter, the reaction solution was filtered through Celite, and the filtrate was washed with methanol (13.0 L). The same operation was repeated three times, and methanol was distilled off under reduced pressure to give a solid (1.1 kg).

The obtained solid was suspended in ethyl acetate (6.4 L), the suspension was stirred for 5 minutes, then heptane (25.0 L) was added thereto, and the mixture was stirred for 20 minutes. The precipitated solid was collected by filtration and dried under reduced pressure to give 4,4'-dimethyl-3, 3'-diaminodiphenyl sulfone (1.08 kg).

Other Components [x5]

[x5]-1 "SUMIKA EXCEL (registered trademark)" PES5003P (polyether sulfone, manufactured by Sumitomo Chemical Company, Limited)

<Method for Preparing Epoxy Resin Composition>

The predetermined amounts of components other than the curing agent were placed in a kneader, the mixture was heated to 150° C. with being kneaded, and kneaded at 150° C. for 1 hour to give a transparent viscous liquid. The temperature of the viscous liquid was lowered to 60° C. with the liquid being kneaded, then the curing agent was added thereto, and the mixture was kneaded at 60° C. for 30 minutes to give an epoxy resin composition.

<Method for Evaluating Storage Stability of Epoxy Resin Composition>

The storage stability of the epoxy resin composition was evaluated as follows. The initial epoxy resin composition (3 g) obtained by the above method was weighed out in an aluminum cup and allowed to stand in a thermo-hygrostat bath under the environment at 40° C. and 75% RH for 10 days. The glass transition temperature after storage was defined as $T_1$, and the initial glass transition temperature was defined as $T_0$. The change amount of the glass transition temperature was defined as $\Delta Tg=T_1-T_0$, and the storage stability was judged by the value of the $\Delta Tg$. The glass transition temperature was measured by weighing out 3 mg of the epoxy resin after storage in a sample pan and heating the resin at 5° C./min from −20° C. to 150° C. using a differential scanning calorimeter (Q-2000: manufactured by TA Instruments). The midpoint of the inflection point of the obtained heat generation curve was obtained as Tg.

<Method for Measuring Temperature at Which Epoxy Resin Composition Exhibits Minimum Viscosity>

The temperature at which the epoxy resin composition exhibits a minimum viscosity was obtained as follows. The initial epoxy resin composition obtained by the above method was collected and subjected to dynamic viscoelastic measurement in the temperature range of 30 to 250° C. under conditions of a torsional vibration frequency of 0.5 Hz and a heating rate of 5° C./min using a viscoelasticity measuring device (ARES, manufactured by TA Instruments Inc.). The minimum point of the viscosity curve was taken as the temperature at which the epoxy resin composition exhibits a minimum viscosity.

<Method for Evaluating Bending Modulus of Resin Cured Product>

The epoxy resin composition was defoamed in vacuum, and then cured for 2 hours at a temperature of 220° C. in a mold set to give a thickness of 2 mm with a 2 mm thick "Teflon" (registered trademark) spacer to give a plate-like resin cured product having a thickness of 2 mm. From the resin cured product, a specimen having a width of 10 mm and a length of 60 mm was cut out and subjected to three point bending at a span of 32 mm and a cross head speed of 100 mm/min using an Instron universal testing machine (manufactured by Instron) to measure the bending modulus. The average of the values obtained by measuring five specimens cut out from the same resin cured product was taken as the value of bending modulus.

<Method for Preparing Precured Product>

The predetermined amounts of components other than the curing agent were placed in a stainless steel beaker, and the mixture was heated to 150° C. with being appropriately kneaded with a spatula to give a transparent viscous liquid. The temperature of the viscous liquid was lowered to 60° C., then the curing agent was added thereto, and the mixture was kneaded at 60° C. for 30 minutes to give an epoxy resin composition. The prepared epoxy resin composition (about 3 g) was weighed out in an aluminum cup, placed a hot air oven preheated to 140° C., allowed to stand for 2 hours, taken out from the oven, and cooled to room temperature to give a precured product.

<Method for Measuring Resin Properties of Precured Product>

(1) Method for Evaluating Storage Stability

The storage stability of the precured product was determined as follows. The precured product (3 g) obtained by the above method was weighed out in an aluminum cup and allowed to stand in a thermo-hygrostat bath under the environment of 40° C. and 75% RH for 6 days. The glass transition temperature after storage was defined as $T_1$, and the initial glass transition temperature (before the precured product was allowed to stand in the thermo-hygrostat bath) was defined as $T_0$. The change amount of the glass transition temperature was defined as $\Delta Tg=T_1-T_0$, and the storage stability was judged by the value of the $\Delta Tg$. The glass transition temperature was measured by weighing out 3 mg each of the precured products before being allowed to stand in the thermo-hygrostat bath and after being allowed to stand for 6 days in a sample pan, and heating the precured products at 5° C./min from −20° C. to 150° C. using a differential scanning calorimeter (Q-2000: manufactured by TA Instruments). The midpoint of the inflection point of the obtained heat generation curve was taken as the glass transition temperature Tg.

(2) Method for Measuring Degree of Curing and Amount of Heat Generation

The prepared epoxy resin composition (3 mg) was weighted out in a sample pan, and subjected to measurement under conditions of the constant rate heating of 5° C./min from −30° C. to 300° C. using a differential scanning calorimeter (Q-2000: manufactured by TA Instruments). The amount of heat generation was calculated from the obtained DSC curve according to JIS K0129 (1994). The amount of heat generation of the precured product was also measured in the same manner as above. The degree of curing of the precured product was calculated from (the amount of heat generation of the precured product)/(the amount of heat generation of the epoxy resin composition)×100.

<Method for Evaluating Bending Modulus of Resin Cured Product (Additional Curing)>

The epoxy resin composition was defoamed in vacuum, then cured for 2 hours at a temperature of 140° C. in a mold set to give a thickness of 2 mm with a 2 mm thick "Teflon (registered trademark)" spacer, and allowed to stand for 24 hours at room temperature to give a precured product. The obtained precured product was additionally cured at a temperature of 220° C. for 2 hours to give a plate-like resin cured product having a thickness of 2 mm. From the resin cured product, a specimen having a width of 10 mm and a length of 60 mm was cut out and subjected to three point bending at a span of 32 mm and a cross head speed of 100 mm/min using an Instron universal testing machine (manufactured by Instron) to measure the bending modulus. The average of the values obtained by measuring five specimens cut out from the same resin cured product was taken as the value of bending modulus.

<Method for Measuring Exothermic Onset Temperature of Epoxy Resin Composition>

The prepared epoxy resin composition (3 mg) was weighted out in a sample pan, and subjected to measurement under conditions of the constant rate heating of 5° C./min from −30° C. to 300° C. using a differential scanning calorimeter (Q-2000: manufactured by TA Instruments). The baseline of the DSC curve was set according to JIS K0129 (1994), and the point at which the tangent of the rise of the DSC curve due to heat generation crosses the baseline obtained by the above method was taken as the exothermic onset temperature.

<Method for Producing Prepreg>

The epoxy resin composition prepared according to the above <Method for Preparing Epoxy Resin Composition> was applied on release paper using a film coater to produce a resin film with a predetermined mass per unit area. The mass per unit area of the resin film was adjusted to be 39 g/m².

This resin film was set in a prepreg making instrument, and a sheet-shaped carbon fiber "TORAYCA (registered trademark)" T700S (manufactured by TORAY INDUSTRIES, INC., mass per unit area: 150 g/m²) aligned in one direction was impregnated with the resin film from both sides thereof by heating and pressing to give a prepreg. The resin content of the prepreg was 35% by mass.

<Method for Evaluating Properties of Fiber-Reinforced Composite Material>

(1) Method for Evaluating 0° Bending Strength and 0° Bending Modulus of Fiber-Reinforced Composite Material (Mechanical Properties of Fiber-Reinforced Composite Material)

The fiber direction of the unidirectional prepreg prepared by the above <Method for Producing Prepreg> was aligned, and 13 plies of the prepregs were laminated and molded at a temperature of 220° C. for 120 minutes under a pressure of 0.6 MPa at a heating rate of 1.7° C./min in an autoclave to prepare a CFRP of a unidirectional material having a thickness of 2 mm. From this laminated board, a specimen having a width of 15 mm and a length of 100 mm was cut out and subjected to three point bending using an Instron universal testing machine (manufactured by Instron) according to JIS K 7074 (1988). The 0° bending strength and the 0° bending modulus were measured at a span of 80 mm, a crosshead speed of 5.0 mm/min, an indenter diameter of 10 mm, and a fulcrum diameter of 4.0 mm. The converted values at the fiber content of 60% by mass were calculated from the average of the values obtained from the six specimens cut but from the same laminated plate, and were taken as 0° bending strength and 0° bending modulus.

(2) Method for Evaluating Appearance of Fiber-Reinforced Composite Material

The fiber direction of the unidirectional prepreg produced by the above <Method for Producing Prepreg> was aligned, and 13 plies of the prepregs were laminated to give a laminate. The laminate was placed in a single-sided mold, the periphery of the single-sided mold was covered with a sealing material (the cover film and the mold were joined together to seal the inside of the mold), and then a bleeder made of a thick nonwoven fabric (which plays a role of a spacer that provides a passage of air and the resin) was placed in the circumference of the laminate. A tube was placed as a suction port on the bleeder, and then the sealing material and the cover film were joined together to cover the single-sided mold with the cover film. As the cover film, a film having flexibility was used. A vacuum pump was connected to the tube as a suction port to suck air in a molding space (a space formed by the single-sided mold and the cover film and including the laminate), thereby the pressure in the molding space was reduced. Then, the single-sided mold was placed in the oven controlled at 220° C. and held for 120 minutes to produce a fiber-reinforced composite material. After the fiber-reinforced composite material was held for 120 minutes, the single-sided mold was taken out to demold the fiber-reinforced composite material.

The appearance of the fiber-reinforced composite material was visually judged from the viewpoint of smoothness of the surface and the presence or absence of blurs and pinholes. The material having a smooth surface without blurs or pinholes was evaluated as A, the material confirmed to have one or two of irregularities, blurs, and pinholes on the surface was evaluated as B, the material confirmed to have irregularities on the surface, blurs and pinholes was evaluated as C.

Example 1

An epoxy resin composition was prepared using 100 parts by mass of "jER (registered trademark)" 828 as the epoxy resin other than the component X and 32.9 parts by mass of 2,2'-diaminodiphenyl sulfone as the curing agent A, according to the above <Method for Preparing Epoxy Resin Composition>.

This epoxy resin composition was evaluated according to the <Method for Evaluating Storage Stability of Resin Composition> and the <Method for Measuring Temperature at Which Epoxy Resin Composition Exhibits Minimum Viscosity>. The composition had a ΔTg of 3° C. and thus had good storage stability, and exhibited the minimum viscosity at 183° C.

The epoxy resin composition was cured by the above method to prepare a resin cured product, and the bending modulus thereof was measured and found to be 3.61 GPa.

A prepreg having a resin content of 35% by mass was produced from the obtained epoxy resin composition using a carbon fiber "TORAYCA (registered trademark)" T700S (manufactured by Toray Industries, Inc.) as a reinforcing fiber according to the <Method for Producing Prepreg>.

Mechanical properties of the fiber-reinforced composite material obtained from the prepreg were measured. The material had a 0° bending strength of 1580 MPa and a 0° bending modulus of 127 GPa, and thus showed good mechanical properties.

The fiber-reinforced composite material obtained by holding the laminate of the prepregs in a reduced pressure state in an oven controlled at 220° C. for 120 minutes had a good surface appearance and was evaluated as A.

Examples 2 to 17

An epoxy resin composition, an epoxy resin cured product, and a fiber-reinforced composite material were prepared in the same manner as in Example 1 except that the resin composition was changed as shown in Tables 1-1 and 1-2. As in Example 1, all of the obtained resin compositions had good storage stability and a good bending modulus of the cured product, and the temperatures at which the epoxy resin composition exhibits a minimum viscosity were in an appropriate temperature range.

The 0° bending strength, 0° bending modulus, and surface appearance of the fiber-reinforced composite materials were good.

Comparative Example 1

An epoxy resin composition and an epoxy resin cured product were prepared in the same manner as in Example 1 except that 4,4'-dimethyl-3,3'-diaminodiphenyl sulfone was used instead of the curing agent A. The resin composition and evaluation results are shown in Table 2. The bending modulus was 3.40 GPa, and thus insufficient. In addition, the ΔTg was 27° C., and thus storage stability was insufficient. The temperature at which the epoxy resin composition exhibits a minimum viscosity was 108° C., and thus low.

Since the bending modulus of the resin cured product was low, the 0° bending strength of the fiber-reinforced composite material was 1480 MPa, and thus insufficient. The surface appearance was poor.

Comparative Example 2

An epoxy resin composition and an epoxy resin cured product were prepared in the same manner as in Example 1 except that 3,3'-diaminodiphenyl sulfone was used instead of the curing agent A. The resin composition and evaluation results are shown in Table 2. The bending modulus was 3.82 GPa, and thus good. However, the ΔTg was 25° C., and thus storage stability was insufficient. The temperature at which the epoxy resin composition exhibits a minimum viscosity was 134° C., and thus low.

The 0° bending properties of the fiber-reinforced composite material were good, but the surface appearance was poor.

Comparative Example 3

An epoxy resin composition and an epoxy resin cured product were prepared in the same manner as in Example 1 except that 4,4'-diaminodiphenyl sulfone was used instead of the curing agent A. The resin composition and evaluation results are shown in Table 2. The ΔTg was 9° C., and thus storage stability was good, but the bending modulus was 3.22 GPa, and thus insufficient. The temperature at which the epoxy resin composition exhibits a minimum viscosity was 142° C., and thus low.

Since the bending modulus of the resin cured product was low, the 0° bending strength of the fiber-reinforced composite material was 1470 MPa, and thus insufficient. The surface appearance was poor.

Comparative Example 4

An epoxy resin composition and an epoxy resin cured product were prepared according to the method described in Example 1 of Patent Document 1. The resin composition and evaluation results are shown in Table 2. The bending modulus was 3.50 GPa, and thus good, but the ΔTg after storage at 40° C. and 75% RH for 10 days was 28° C., and thus storage stability was insufficient. The temperature at which the epoxy resin composition exhibits a minimum viscosity was 146° C., and thus low.

Since the bending modulus of the resin cured product was low, the 0° bending strength of the fiber-reinforced composite material was 1500 MPa, and thus insufficient. The surface appearance was poor.

Example 18

Measurement of |T2−T1|

An epoxy resin composition was prepared according to the above <Method for Preparing Epoxy Resin Composition> by adding 80 parts by mass of "jER (registered trademark)" 828, 20 parts by mass of "SUMI-EPDXY (registered trademark)" ELM 434 (manufactured by Sumitomo Chemical Industry Company Limited), and 4.1 parts by mass of 4,4'-dimethyl-3,3'-diaminodiphenyl sulfone as a curing agent based on 100 parts by mass of the total of the epoxy resin. A prepreg having a resin content of 35% by mass was produced from the obtained epoxy resin composition using a carbon fiber "TORAYCA (registered trademark)" T700S (manufactured by Toray Industries, Inc.) as a reinforcing fiber according to the <Method for Producing Prepreg>.

T1 of the obtained epoxy resin composition was measured according to the <Method for Measuring Exothermic Onset Temperature of Epoxy Resin Composition>.

An epoxy resin composition was prepared according to the <Method for Preparing Epoxy Resin Composition> by adding 80 parts by mass of "jER (registered trademark)" 828, 20 parts by mass of "SUMI-EPDXY (registered trademark)" ELM 434 (manufactured by Sumitomo Chemical Industry Company Limited), and 33 parts by mass of 2,2'-diaminodiphenyl sulfone as a curing agent based on 100 parts by mass of the total of the epoxy resin.

T2 of the obtained epoxy resin composition was measured according to the <Method for Measuring Exothermic Onset Temperature of Epoxy Resin Composition>.

The obtained value of |T2−T1| was 88° C.

Evaluation of Properties in Example 18

An epoxy resin composition was prepared according to the above <Method for Preparing Epoxy Resin Composition> by adding 80 parts by mass of "jER (registered trademark)" 828, 20 parts by mass of "SUMI-EPDXY (registered trademark)" ELM 434 (manufactured by Sumitomo Chemical Industry Company Limited), and 33 parts by mass of 2,2'-diaminodiphenyl and 4.1 parts by mass of 4,4'-dimethyl-3,3'-diaminodiphenyl sulfone as a curing agent based on 100 parts by mass of the total of the epoxy resin.

A precured product was prepared from the obtained epoxy resin composition according to the <Method for Preparing Precured Product>.

The storage stability of the obtained precured product was evaluated. The ΔTg increased only by 0.7° C. after storage at 40° C. and 75% RH for 6 days, and thus, the precured product had sufficient storage stability. The degree of curing of the precured product was 24%.

The precured product was additionally cured by the above method to prepare a resin cured product, and the resin cured product was subjected to three point bending test. The resin cured product had a bending modulus of 3.90 GPa, and thus showed good mechanical properties.

The storage stability of the obtained precured product was evaluated. The ΔTg increased only by 0.7° C. after storage at 40° C. and 75% RH for 6 days, and thus, the precured product had sufficient storage stability. The degree of curing of the precured product was 24%.

The amount of heat generation of the precured product was evaluated and found to be 199 J/g.

The precured product was cured by the above method to prepare a resin cured product, and the resin cured product was subjected to three point bending test. The resin cured product had a bending modulus of 3.90 GPa, and thus showed good mechanical properties.

Mechanical properties of the fiber-reinforced composite material obtained from the prepreg including the epoxy resin composition were measured. The material had a 0° bending strength of 1640 MPa and a 0° bending modulus of 128 GPa, and thus showed good mechanical properties.

Examples 19 to 22

An epoxy resin composition, a precured product, a resin cured product, and a fiber-reinforced composite material were prepared in the same manner as in Example 18 except that the amount of the curing agent added was changed as shown in Table 3-1. |T2−T1| was evaluated in the same manner as in Example 18. |T2−T1| showed almost constant values of 85 to 89° C. The storage stability of each precured product was evaluated in the same manner as in Example 18. All the precured products had good storage stability.

The amounts of heat generation of the precured products in Examples 19 to 22 were 170, 156, 130, and 110 J/g, respectively.

The degree of curing of the precured product increased as the compounding ratio of 4,4'-dimethyl-3,3'-diaminodiphenyl sulfone was increased. Specifically, the degrees of curing in Examples 19 to 22 were 37, 44, 58, and 65%, respectively, and the relationship between the compounding ratio between 4,4'-dimethyl-3,3'-diaminodiphenyl sulfone and 2,2'-diaminodiphenyl sulfone and the degree of curing showed linearity.

All the resin cured products had good values of the bending modulus.

Both the 0° bending strength and the 0° bending modulus of all the fiber-reinforced composite materials were good.

Examples 23 to 27

An epoxy resin composition, a precured product, a resin cured product, and a fiber-reinforced composite material were produced in the same manner as in Examples 18 to 22 except that 2,2'-diaminodiphenyl sulfone and 3,3'-diaminodiphenyl sulfone were used as the curing agents. |T2−T1| was evaluated in the same manner as in Examples 18 to 22. The values of |T2−T1| were 57 to 60° C. The storage stability of each precured product was evaluated in the same manner as in Example 18. All the precured products had good storage stability.

The amounts of heat generation of the precured products in Examples 23 to 27 were 198, 177, 163, 142, and 120 J/g, respectively.

The degree of curing varied from 39 to 75% depending on the compounding ratio between the curing agents.

All the resin cured products had good values of the bending modulus.

Both the 0° bending strength and the 0° bending modulus of all the fiber-reinforced composite materials were good.

Examples 28 to 30

An epoxy resin composition, a precured product, a resin cured product, and a fiber-reinforced composite material were prepared in the same manner as in Example 18 except that the resin compositions were changed as shown in Table 3-3. |T2−T1| was evaluated in the same manner as in Examples 18 to 22. The values of |T2−T1| in Examples 28 to 30 were 85, 88, 59 and 44° C., respectively. The storage stability of each precured product was evaluated in the same manner as in Example 18. All the precured products had good storage stability. The degrees of curing of the precured products are shown in the table.

The amounts of heat generation of the precured products in Examples 28 to 30 were 164, 167, 155, and 115 J/g, respectively.

All the resin cured products had good values of the bending modulus.

Both the 0° bending strength and the 0° bending modulus of all the fiber-reinforced composite materials were good.

Comparative Examples 5 to 9

An epoxy resin composition, a precured product, a resin cured product, and a fiber-reinforced composite material were produced in the same manner as in Examples 18 to 22 except that 4,4'-diaminodiphenyl sulfone and 3,3'-diaminodiphenyl sulfone were used as the curing agents. |T2−T1|, storage stability of the precured product, the degree of curing, and the amount of heat generation were also evaluated in the same manner as in Examples 18 to 22.

The values of |T2−T1| were 11 to 15° C., and thus low.

When the ratio between the curing agents used in combination was changed, the change in the degree of curing was 51 to 59%, and thus small. Therefore, when the resin composition is used in a prepreg, the tackiness and drapability cannot be controlled. In Comparative Examples 8 and 9, ΔTgs were large and the storage stability was insufficient.

Since the bending modulus of the resin cured product was low, the 0° bending strength of the fiber-reinforced composite material was insufficient.

Comparative Examples 10 to 14

An epoxy resin composition, a precured product, a resin cured product, and a fiber-reinforced composite material were produced in the same manner as in Examples 18 to 22 except that 4,4'-diaminodiphenyl sulfone and triethylenetetramine were used as the curing agents. |T2−T1|, storage stability of the precured product, the degree of curing, and the amount of heat generation were also evaluated in the same manner as in Examples 18 to 22.

The values of |T2−T1| were 115 to 120° C., and remarkably large.

Since triethylenetetramine having high reactivity with the epoxy resin was used, the ΔTg was increased and the storage stability remarkably decreased. The mechanical properties were also insufficient.

Since the bending modulus of the resin cured product was low, the 0° bending strength of the fiber-reinforced composite material was insufficient.

Comparative Examples 15 to 19

An epoxy resin composition, a precured product, a resin cured product, and a fiber-reinforced composite material were produced in the same manner as in Examples 18 to 22 except that diethyltoluenediamine and triethylenetetramine were used as the curing agents. |T2−T1|, storage stability of the precured product, the degree of curing, and the amount of heat generation were also evaluated in the same manner as in Examples 18 to 22.

The values of |T2−T1| were 96 to 98° C., and remarkably large.

ΔTgs were remarkably large, and storage stability was insufficient. The mechanical properties were also low.

Since the bending modulus of the resin cured product was low, the 0° bending strength of the fiber-reinforced composite material was insufficient.

TABLE 1-1

|  | | Component | Example 1 | Example 2 | Example 3 | Example 4 | Example 5 |
|---|---|---|---|---|---|---|---|
| Epoxy resin | "jER ®" 828 | Bisphenol A epoxy resin | 100 | 80 | 70 | 80 | 70 |
|  | "EPICLON ®" EXA-1514 | Bisphenol S epoxy resin | | | | | |
|  | "Epikote ®" YX-4000H | Biphenyl epoxy resin | | | | | |
|  | x1: "SUMI-EPOXY ®" ELM 434 | Diaminodiphenylmethane epoxy resin | | | 20 | | |
|  | x1: "Araldite ®" MY0600 | Aminophenol epoxy resin | | | | 30 | |
|  | x1: "jER ®" 154 | Phenol novolak epoxy resin | | | | | |
|  | x2: "EPICLON ®" 830 | Bisphenol F epoxy resin | | | | 20 | 30 |
|  | x2: "Epotohto ®" YDF-2001 | Bisphenol F epoxy resin | | | | | |
|  | x2: "jER ®" 4010P | Bisphenol F epoxy resin | | | | | |
|  | x3: "TEPIC ®"-S | Isocyanuric acid epoxy resin | | | | | |
| Curing agent | Seikacure-S | 4,4'-diaminodiphenyl sulfone | | | | | |
|  | 3,3'DAS | 3,3'-diaminodiphenyl sulfone | | | | | |

TABLE 1-1-continued

| | | | | | | | |
|---|---|---|---|---|---|---|---|
| | | 2,2'-diaminodiphenyl sulfone | | 32.9 | 36.6 | 38.8 | 33.7 | 34.1 |
| Properties of resin composition | Tg change after storage at 40° C. and 75% RH for 10 days | | ° C. | 3 | 1 | 1 | 2 | 2 |
| Properties of resin cured product | Bending modulus | | GPa | 3.61 | 3.80 | 4.11 | 3.90 | 3.92 |
| Properties of resin composition | Temperature at which the resin composition exhibits the minimum viscosity when heated from 40° C. at a rate of 5° C./min | | ° C. | 183 | 180 | 179 | 182 | 180 |
| Properties of fiber reinforced composite material | 0° Bending strength | | MPa | 1580 | 1611 | 1660 | 1633 | 1640 |
| | 0° Bending modulus | | GPa | 127 | 128 | 128 | 129 | 129 |
| Properties of fiber reinforced composite material | Surface appearance | | | A | A | A | A | A |

| | | Component | | Example 6 | Example 7 | Example 8 | Example 9 |
|---|---|---|---|---|---|---|---|
| Epoxy resin | "jER ®" 828 | Bisphenol A epoxy resin | | 50 | 80 | 70 | 50 |
| | "EPICLON ®" EXA-1514 | Bisphenol S epoxy resin | | | | | |
| | "Epikote ®" YX-4000H | Biphenyl epoxy resin | | | | | |
| | x1: "SUMI-EPOXY ®" ELM 434 | Diaminodiphenylmethane epoxy resin | | | | | 25 |
| | x1: "Araldite ®" MY0600 | Aminophenol epoxy resin | | | | | |
| | x1: "jER ®" 154 | Phenol novolak epoxy resin | | | | | |
| | x2: "EPICLON ®" 830 | Bisphenol F epoxy resin | | 50 | | | |
| | x2: "Epotohto ®" YDF-2001 | Bisphenol F epoxy resin | | | | | |
| | x2: "jER ®" 4010P | Bisphenol F epoxy resin | | | | | |
| | x3: "TEPIC ®"-S | Isocyanuric acid epoxy resin | | | 20 | 30 | 25 |
| Curing agent | Seikacure-S | 4,4'-diaminodiphenyl sulfone | | | | | |
| | 3,3'DAS | 3,3'-diaminodiphenyl sulfone | | | | | |
| | — | 2,2'-diaminodiphenyl sulfone | | 34.9 | 38.7 | 41.6 | 44.9 |
| Properties of resin composition | Tg change after storage at 40° C. and 75% RH for 10 days | | ° C. | 2 | 2 | 2 | 0.5 |
| Properties of resin cured product | Bending modulus | | GPa | 3.85 | 4.03 | 4.21 | 4.32 |
| Properties of resin composition | Temperature at which the resin composition exhibits the minimum viscosity when heated from 40° C. at a rate of 5° C./min | | ° C. | 177 | 175 | 177 | 180 |
| Properties of fiber reinforced composite material | 0° Bending strength | | MPa | 1630 | 1650 | 1700 | 1720 |
| | 0° Bending modulus | | GPa | 129 | 128 | 129 | 128 |
| Properties of fiber reinforced composite material | Surface appearance | | | A | A | A | A |

TABLE 1-2

| | Component | | Example 10 | Example 11 | Example 12 | Example 13 | Example 14 | Example 15 | Example 16 | Example 17 |
|---|---|---|---|---|---|---|---|---|---|---|
| Epoxy resin | "jER ®" 828 | Bisphenol A epoxy resin | 70 | 70 | 50 | 50 | 50 | 50 | 70 | 70 |
| | "EPICLON ®" EXA-1514 | Bisphenol S epoxy resin | | | | | | | | |
| | "Epikote ®" YX-4000H | Biphenyl epoxy resin | | | | | | | | |

TABLE 1-2-continued

| | Component | | Example 10 | Example 11 | Example 12 | Example 13 | Example 14 | Example 15 | Example 16 | Example 17 |
|---|---|---|---|---|---|---|---|---|---|---|
| | x1: "SUMI-EPOXY ®" ELM 434 | Diaminodiphenylmethane epoxy resin | 30 | 30 | 50 | | | | 10 | |
| | x1: "Araldite ®" MY0600 | Aminophenol epoxy resin | | | | | | | | |
| | x1: "jER ®" 154 | Phenol novolak epoxy resin | | | | | | | | |
| | x2: "EPICLON ®" 830 | Bisphenol F epoxy resin | | | | | | | | |
| | x2: "Epotohto ®" YDF-2001 | Bisphenol F epoxy resin | | | | 50 | | | | |
| | x2: "jER ®" 4010P | Bisphenol F epoxy resin | | | | | 50 | 40 | 30 | 30 |
| | x3: "TEPIC ®"-S | Isocyanuric acid epoxy resin | | | | | | | | |
| Curing agent | Seikacure-S | 4,4'-diaminodiphenyl sulfone | | 7.7 | | | | | | 4.7 |
| | 3,3'DAS | 3,3'-diaminodiphenyl sulfone | 7.7 | | | | | | 4.7 | |
| | — | 2,2'-diaminodiphenyl sulfone | 30.8 | 30.8 | 33.8 | 23 | 17.2 | 22.2 | 18.8 | 18.8 |
| Properties of resin composition | Tg change after storage at 40° C. and 75% RH for 10 days | ° C. | 6 | 2 | 3 | 1 | 2 | 2 | 5 | 2 |
| Properties of resin cured product | Bending modulus | GPa | 3.81 | 3.75 | 4.00 | 3.89 | 3.98 | 3.98 | 3.81 | 3.61 |
| Properties of resin composition | Temperature at which the resin composition exhibits the minimum viscosity when heated from 40° C. at a rate of 5° C./min | ° C. | 181 | 183 | 185 | 185 | 182 | 181 | 170 | 172 |
| Properties of fiber reinforced composite material | 0° Bending strength | MPa | 1633 | 1600 | 1640 | 1600 | 1645 | 1644 | 1580 | 1570 |
| | 0° Bending modulus | GPa | 127 | 128 | 128 | 127 | 129 | 129 | 126 | 126 |
| Properties of fiber reinforced composite material | Surface appearance | | A | A | A | A | A | A | B | B |

TABLE 2

| | Component | | Comparative Example 1 | Comparative Example 2 | Comparative Example 3 | Comparative Example 4 |
|---|---|---|---|---|---|---|
| Epoxy resin | "jER ®" 828 | Bisphenol A epoxy resin | 100 | 80 | 80 | |
| | "EPICLON ®" EXA-1514 | Bisphenol S epoxy resin | | | | 5 |
| | "Epikote ®" YX-4000H | Biphenyl epoxy resin | | | | 25 |
| | x1: "SUMI-EPOXY ®" ELM 434 | Diaminodiphenylmethane epoxy resin | | 20 | 20 | |
| | x1: "Araldite ®" MY0600 | Aminophenol epoxy resin | | | | |
| | x1: "jER ®" 154 | Phenol novolak epoxy resin | | | | 35 |
| | x2: "EPICLON ®" 830 | Bisphenol F epoxy resin | | | | 35 |
| Thermoplastic resin | "SUMIKA EXCEL ®" PES 5003P | Polyether sulfone | | | | 15 |
| Curing agent | Seikacure-S | 4,4'-diaminodiphenyl sulfone | | | 36.6 | |
| | 3,3'DAS | 3,3'-diaminodiphenyl sulfone | | 36.6 | | 34 |
| | — | 4,4'-dimethyl-3,3'-diaminodiphenyl sulfone | 32.9 | | | |
| | — | 2,2'-diaminodiphenyl sulfone | | | | |
| Properties of resin composition | Tg change after storage at 40° C. and 75% RH for 10 days | ° C. | 27 | 25 | 9 | 28 |
| Properties of resin cured product | Bending modulus | GPa | 3.40 | 3.82 | 3.22 | 3.50 |
| Properties of resin composition | Temperature at which the resin composition exhibits the minimum viscosity when heated from 40° C. at a rate of 5° C./min | ° C. | 108 | 134 | 142146 | |

TABLE 2-continued

| | Component | | Comparative Example 1 | Comparative Example 2 | Comparative Example 3 | Comparative Example 4 |
|---|---|---|---|---|---|---|
| Properties of fiber reinforced composite material | 0° Bending strength | MPa | 1480 | 1520 | 1470 | 1500 |
| | 0° Bending modulus | GPa | 125 | 125 | 126 | 126 |
| Properties of fiber reinforced composite material | Surface appearance | | C | C | C | C |

TABLE 3-1

| | Component | | Example 18 | Example 19 | Example 20 | Example 21 | Example 22 |
|---|---|---|---|---|---|---|---|
| Epoxy resin | "jER ®" 828 | Bisphenol A epoxy resin | 80 | 80 | 80 | 80 | 80 |
| | x1: "SUMI-EPOXY ®" ELM 434 | Diaminodiphenylmethane epoxy resin | 20 | 20 | 20 | 20 | 20 |
| Curing agent | — | 2,2'-diaminodiphenyl sulfone | 33 | 25.6 | 18.3 | 11 | 3.7 |
| | — | 4,4'-dimethyl-3,3'-diaminodiphenyl sulfone | 4.1 | 12.2 | 20.4 | 28.5 | 36.7 |
| Properties of uncured resin | T2 − T1 | ° C. | 88 | 87 | 89 | 85 | 89 |
| Properties of resin after precuring | Tg change after storage at 40° C. and 75% RH for 6 days | ° C. | 0.7 | 1.3 | 1.5 | 3 | 5 |
| | Degree of curing | ° | 24 | 37 | 44 | 58 | 65 |
| | Amount of heat generation | J/g | 199 | 170 | 156 | 130 | 110 |
| Properties of resin cured product | Bending modulus | GPa | 3.90 | 3.85 | 3.85 | 3.75 | 3.75 |
| Properties of fiber reinforced composite material | 0° Bending strength | MPa | 1640 | 1631 | 1640 | 1600 | 1610 |
| | 0° Bending modulus | GPa | 128 | 128 | 129 | 129 | 128 |

TABLE 3-2

| | Component | | Example 23 | Example 24 | Example 25 | Example 26 | Example 27 |
|---|---|---|---|---|---|---|---|
| Epoxy resin | "jER ®" 828 | Bisphenol A epoxy resin | 80 | 80 | 80 | 80 | 80 |
| | x1: "SUMI-EPOXY ®" ELM 434 | Diaminodiphenylmethane epoxy resin | 20 | 20 | 20 | 20 | 20 |
| Curing agent | — | 2,2'-diaminodiphenyl sulfone | 33 | 25.6 | 18.3 | 11 | 3.7 |
| | 3,3'DAS | 3,3'-diaminodiphenyl sulfone | 3.7 | 11 | 18.3 | 25.6 | 33 |
| Properties of uncured resin | T2 − T1 | ° C. | 60 | 58 | 57 | 57 | 58 |
| Properties of resin after precuring | Tg change after storage at 40° C. and 75% RH for 6 days | ° C. | 0.4 | 0.9 | 1.6 | 3.1 | 3.5 |
| | Degree of curing | ° | 39 | 45 | 56 | 69 | 75 |
| | Amount of heat generation | J/g | 198 | 177 | 163 | 142 | 120 |
| Properties of resin cured product | Bending modulus | GPa | 3.90 | 3.95 | 3.95 | 4.05 | 4.10 |
| Properties of fiber reinforced composite material | 0° Bending strength | MPa | 1643 | 1650 | 1655 | 1700 | 1695 |
| | 0° Bending modulus | GPa | 127 | 128 | 128 | 129 | 129 |

TABLE 3-3

| | Component | | Example 28 | Example 29 | Example 30 |
|---|---|---|---|---|---|
| Epoxy resin | x2: "EPICLON ®" 830 | Liquid bisphenol F epoxy resin | 60 | 80 | 60 |
| | x1: "SUMI-EPOXY ®" ELM 434 | Diaminodiphenylmethane epoxy resin | | 20 | |
| | x1: "jER ®" 154 | Phenol novolak epoxy resin | 20 | | 20 |
| | x1: "Araldite ®" MY0600 | Aminophenol epoxy resin | 20 | | 20 |
| Curing agent | 3,3'DAS | 3,3'-diaminodiphenyl sulfone | | | 14.6 |
| | — | 2,2'-diaminodiphenyl sulfone | 27.8 | 27.9 | 19.8 |
| | — | 4,4'-dimethyl-3,3'-diaminodiphenyl sulfone | 13.2 | 13.3 | |
| Properties of uncured resin | T2 − T1 | ° C. | 85 | 88 | 59 |
| Properties of resin after precuring | Tg change after storage at 40° C. and 75% RH for 6 days | ° C. | 2 | 1.8 | 1.9 |
| | Degree of curing | % | 37 | 36 | 55 |
| | Amount of heat generation | J/g | 164 | 167 | 155 |
| Properties of resin cured product | Bending modulus | GPa | 4.10 | 4.00 | 3.95 |
| Properties of fiber reinforced composite material | 0° Bending strength | MPa | 1697 | 1670 | 1683 |
| | 0° Bending modulus | GPa | 129 | 128 | 128 |

TABLE 4-1

| | Component | | Comparative Example 5 | Comparative Example 6 | Comparative Example 7 | Comparative Example 8 | Comparative Example 9 |
|---|---|---|---|---|---|---|---|
| Epoxy resin | "jER ®" 828 | Bisphenol A epoxy resin | 80 | 80 | 80 | 60 | 80 |
| | x1: "SUMI-EPOXY ®" ELM 434 | Diaminodiphenylmethane epoxy resin | 20 | 20 | 20 | 20 | 20 |
| Curing agent | Seikacure-S | 4,4'-diaminodiphenyl sulfone | 33 | 25.6 | 18.3 | 11 | 3.7 |
| | 3,3'DAS | 3,3'-diaminodiphenyl sulfone | 3.7 | 11 | 18.3 | 25.6 | 33 |
| Properties of uncured resin | T2 − T1 | ° C. | 14 | 15 | 13 | 12 | 11 |
| Properties of resin after precuring | Tg change after storage at 40° C. and 75% RH for 6 days | ° C. | 4.5 | 5.8 | 8.3 | 11.2 | 13.2 |
| | Degree of curing | ° | 51 | 51 | 54 | 54 | 59 |
| | Amount of heat generation | J/g | 181 | 163 | 148 | 130 | 112 |
| Properties of resin cured product | Bending modulus | GPa | 3.30 | 3.45 | 3.55 | 3.70 | 3.75 |
| Properties of fiber reinforced composite material | 0° Bending strength | MPa | 1450 | 1500 | 1510 | 1533 | 1540 |
| | 0° Bending modulus | GPa | 127 | 128 | 127 | 129 | 128 |

TABLE 4-2

| | Component | | Comparative Example 10 | Comparative Example 11 | Comparative Example 12 | Comparative Example 13 | Comparative Example 14 |
|---|---|---|---|---|---|---|---|
| Epoxy resin | "jER ®" 828 | Bisphenol A epoxy resin | 80 | 80 | 80 | 80 | 80 |
| | x1: "SUMI-EPOXY ®" ELM 434 | Diaminodiphenylmethane epoxy resin | 20 | 20 | 20 | 20 | 20 |
| Curing agent | Seikacure-S | 4,4'-diaminodiphenyl sulfone | 33 | 25.6 | 18.3 | 11 | 3.7 |
| | — | Triethylenetetramine | 1.4 | 4.3 | 7.2 | 10.1 | 12.9 |
| Properties of uncured resin | T2 − T1 | ° C. | 119 | 115 | 116 | 120 | 110 |

TABLE 4-2-continued

|  | Component |  | Comparative Example 10 | Comparative Example 11 | Comparative Example 12 | Comparative Example 13 | Comparative Example 14 |
|---|---|---|---|---|---|---|---|
| Properties of resin after precuring | Tg change after storage at 40° C. and 75% RH for 6 days | ° C. | 22 | 24.7 | 31.1 | 35 | 39 |
|  | Degree of curing | ° | 54 | 58 | 58 | 58 | 59 |
|  | Amount of heat generation | J/g | 174 | 140 | 115 | 77 | 46 |
| Properties of resin cured product | Bending modulus | GPa | 3.20 | 3.12 | 3.05 | 2.87 | 2.80 |
| Properties of fiber reinforced composite material | 0° Bending strength | MPa | 1470 | 1430 | 1430 | 1400 | 1401 |
|  | 0° Bending modulus | GPa | 125 | 125 | 124 | 124 | 124 |

TABLE 4-3

|  | Component |  | Comparative Example 15 | Comparative Example 16 | Comparative Example 17 | Comparative Example 18 | Comparative Example 19 |
|---|---|---|---|---|---|---|---|
| Epoxy resin | "jER ®" 828 | Bisphenol A epoxy resin | 80 | 80 | 80 | 80 | 80 |
|  | x1: "SUMI-EPOXY ®" ELM 434 | Diaminodiphenylmethane epoxy resin | 20 | 20 | 20 | 20 | 20 |
| Curing agent | — | Triethylenetetramine | 1.4 | 4.3 | 7.2 | 10.1 | 11.2 |
|  | — | Diethyltoluenediamine | 23.7 | 18.4 | 13.1 | 7.9 | 2.3 |
| Properties of uncured resin | T2 − T1 | ° C. | 96 | 98 | 97 | 98 | 98 |
| Properties of resin after precuring | Tg change after storage at 40° C. and 75% RH for 6 days | ° C. | 20.5 | 25.7 | 33.1 | 36.1 | 38.1 |
|  | Degree of curing | ° | 61 | 62 | 64 | 64 | 65 |
|  | Amount of heat generation | J/g | 75 | 69 | 57 | 46 | 35 |
| Properties of resin cured product | Bending modulus | GPa | 2.90 | 2.92 | 2.88 | 2.78 | 2.70 |
| Properties of fiber reinforced composite material | 0° Bending strength | MPa | 1410 | 1400 | 1395 | 1380 | 1370 |
|  | 0° Bending modulus | GPa | 126 | 126 | 126 | 125 | 124 |

The unit of each component in the tables is parts by mass.

The invention claimed is:

1. A prepreg comprising:
an epoxy resin composition that contains a curing agent A represented by Chemical formula A and an epoxy resin, and satisfies one of (i) to (iii) below; and
a reinforcing fiber:

[Chemical formula 1]

Chemical formula A

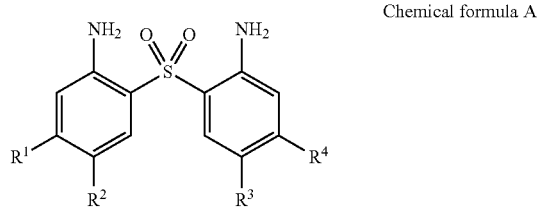

wherein $R^1$, $R^2$, $R^3$ and $R^4$ each independently represent hydrogen, methyl, ethyl, or n-propyl:
(i) satisfying Conditions 1 and 2;
(ii) satisfying Conditions 1 and 3; and
(iii) satisfying Condition 4 where Conditions 1 to 4 are as follows:
Condition 1: a bending modulus of a resin cured product obtained by curing the epoxy resin composition at 220° C. for 120 minutes is 3.60 GPa or more;
Condition 2: Tg change of the epoxy resin composition between before and after storage at 40° C. and 75% RH for 10 days is less than 10° C.;
Condition 3: a temperature at which the epoxy resin composition exhibits a minimum viscosity when heated at a rate of 5° C./min from 40° C. to 250° C. in dynamic viscoelastic measurement is 150° C. or more and 200° C. or less; and
Condition 4: the epoxy resin composition contains a combination of the curing agent A and a curing agent B or a combination of the curing agent A and a curing agent C as a curing agent:
Curing agent B: 4,4'-dimethyl-3,3'-diaminodiphenyl sulfone; and
Curing agent C: 3,3'-diaminodiphenyl sulfone.

2. The prepreg according to claim 1, wherein $R^1$, $R^2$, $R^3$, and $R^4$ in Chemical formula A are all hydrogen.

3. The prepreg according to claim 1, having a total content of a component X below of 20 to 50% by mass relative to 100% by mass of a total mass of the epoxy resin:
Component X: at least one epoxy resin selected from the group consisting of [x1], [x2], and [x3] below:
[x1]: a trifunctional or higher functional epoxy resin having a benzene ring;

[x2]: a bisphenol F epoxy resin; and
[x3]: an isocyanuric acid epoxy resin.

4. A fiber-reinforced composite material, which is a cured product of the prepreg according to claim 1.

* * * * *